United States Patent
Garton (10) Patent No.: US 8,113,532 B2
(45) Date of Patent: Feb. 14, 2012

(54) TRAILER LOCKING SYSTEM AND APPARATUS

(76) Inventor: James R. Garton, Sante Fe, NM (US)

( * ) Notice: Subject to any disclaimer, the term of this patent is extended or adjusted under 35 U.S.C. 154(b) by 621 days.

(21) Appl. No.: 12/080,941

(22) Filed: Apr. 7, 2008

(65) Prior Publication Data

US 2009/0250904 A1    Oct. 8, 2009

(51) Int. Cl.
*A47F 5/00*      (2006.01)
(52) U.S. Cl. ...................................................... 280/507
(58) Field of Classification Search .................... 280/507
See application file for complete search history.

(56) References Cited

U.S. PATENT DOCUMENTS

| | | |
|---|---|---|
| 3,695,631 A | 10/1972 | Schwaiger |
| 3,797,283 A | 3/1974 | Honer |
| D269,420 S | 6/1983 | McClure, Jr. |
| 4,538,827 A | 9/1985 | Plifka |
| 4,548,418 A * | 10/1985 | Wendorff ............................ 280/1 |
| D291,017 S * | 7/1987 | Magness ........................ D34/31 |
| 4,730,841 A | 3/1988 | Ponder |
| 4,756,172 A * | 7/1988 | Weaver ............................... 70/58 |
| 4,774,823 A | 10/1988 | Callison |
| 4,817,401 A | 4/1989 | Cohodar |
| 4,996,855 A | 3/1991 | Havenga et al. |
| 5,063,759 A | 11/1991 | Nee et al. |
| 5,094,423 A * | 3/1992 | Almquist et al. ............. 248/552 |
| 5,113,674 A | 5/1992 | LiCausi |
| 5,197,311 A | 3/1993 | Clark |
| D358,698 S | 5/1995 | Henry |
| 5,433,468 A | 7/1995 | Dixon |
| 5,520,030 A | 5/1996 | Muldoon |
| 5,700,024 A * | 12/1997 | Upchurch ..................... 280/507 |
| D414,307 S | 9/1999 | Quaas |
| 6,019,337 A * | 2/2000 | Brown ........................ 248/354.5 |
| 6,406,052 B1 * | 6/2002 | Bale .............................. 280/507 |
| 6,412,314 B1 | 7/2002 | Jenks |
| 6,484,544 B1 | 11/2002 | Wing |
| 6,530,249 B1 | 3/2003 | Burkhead |
| 6,606,887 B1 | 8/2003 | Zimmer et al. |
| 6,722,686 B2 | 4/2004 | Koy |

\* cited by examiner

*Primary Examiner* — Joanne Silbermann
*Assistant Examiner* — Michael Stabley
(74) *Attorney, Agent, or Firm* — Kevin Lynn Wildenstein (57) ABSTRACT

The present invention is directed towards, in one embodiment, a process, apparatus or assembly to prevent the theft of or movement of a towable trailer while the trailer is unhitched from its corresponding original tow vehicle. In one embodiment, the present invention comprises a support strip coupled to a support housing. Preferably, at least one off-the-shelf locking means is integrated with the support housing which is adapted to securely couple to or otherwise engage a trailer having an integrated locking dome.

19 Claims, 8 Drawing Sheets

TRAILER LOCKING SYSTEM AND APPARATUS

FIELD OF INVENTION

Figure 1:
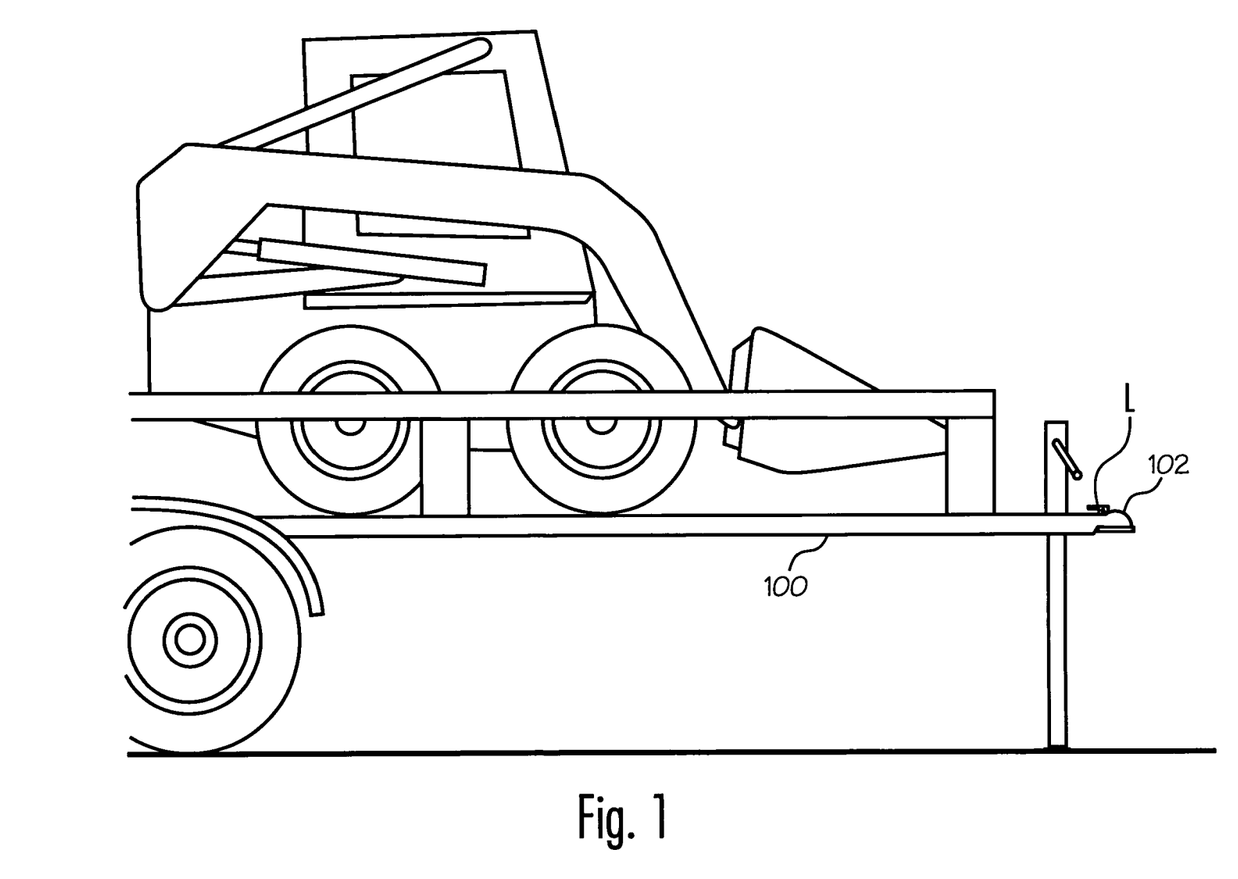
FIG. 1 illustrates a side plan view of a conventional, towable trailer having a tongue with a ball locking mechanism or assembly, the trailer in this illustration being in a parked position and not attached or coupled to a towing vehicle.

The present invention relates generally to trailer hitches and any corresponding trailer locking assemblies. More specifically, the present invention disclosed herein is a trailer locking system, apparatus and assembly for securing a trailer having a tongue 100 (or like mobile apparatus) such as illustrated in FIG. 1 to the present invention when the trailer is not hitched to a towing vehicle. The present invention is also adapted to function as a trailer stand when the trailer is not mobile.

BACKGROUND OF THE INVENTION

As exemplified in FIG. 1, there exists numerous trailers or like movable apparatus which are designed to be towed by a towing vehicle. When a trailer is not used, it is typically placed in a stored position by the user. Thus, as seen in FIG. 1, a trailer is depicted with includes a frame that terminates at a front location in a trailer tongue 100. The tongue typically includes a socket or dome 102 which is designed to fit over a tow ball which is on the towing vehicle. Once engaged to the tow ball, the socket 102 is typically retained in place by the ball latch L. When the trailer is being stored, or is not being used, the trailer is transported to the desired storage location. Thereafter, the user will lower the trailer tongue by operating a crank on the tongue jack until the socket 102 is lifted above (and off) the tow ball. Thereafter, the tow vehicle is moved away from the trailer.

In most instances, such trailers also are designed to transport a wide variety of goods (such as, for example, tools, animals, cars, motorcycles, boats, work equipment and the like). Typically, the trailer is also adapted to store the goods on the trailer when the trailer is in a parked position (and un-hitched to a towing vehicle). In most instances, the goods being transported are highly valuable, so that when the trailer is un-hitched from the towing vehicle (for whatever reason), the goods onboard the trailer should remain secure from unauthorized movement of the trailer. U.S. Pat. No. 6,019,337, at Column 1 and FIG. 1, describes the effort one takes to un-hitch a trailer from a towing vehicle and prepares for storage of the trailer.

However, goods transported on trailers are not always safe from the risk of theft when the trailer is not being used (or, is placed in a storage position). Namely, theft of trailers is a common problem in the trailer industry because once the trailer is unhitched from the towing vehicle and left unattended without any type of locking device, a would-be criminal would merely have to attach another towing vehicle having a suitable trailer hitch ball and towing package to the unattended trailer and drive away with the trailer (and the valuable goods thereon). An unattended trailer tongue provides a ready means for quick coupling to a thief's vehicle for ready removal of the trailer (and its contents, if any). This theft problem can arise both when the trailer is left in an open area (such as on a building site) or a closed area (such as when the trailer is in a storage area or within a fenced, secured area).

Devices and assemblies which intend to prevent the unauthorized access to a trailer are deficient in that such inventions do not incorporate robust elements which would adequately prevent the theft of a movable trailer.

It is therefore desirable to provide a secure trailer locking system and apparatus for a moveable trailer that effectively denies or otherwise impedes unauthorized access to the trailer while it is un-hitched from its corresponding original tow vehicle. The present invention is made for ease of manufacture, employing many common mechanical parts in a unique combination.

SUMMARY OF THE INVENTION

The following summary of the invention is provided to facilitate an understanding of some of the innovative features unique to the present invention, and is not intended to be a full description of variations that may be apparent to those of skill in the art. A full appreciation of the various aspects of the invention can be gained from the entire specification, claims, drawings, and abstract taken as a whole.

The present invention comprises a trailer locking system, apparatus or assembly comprising, in one embodiment, a support strip and a support housing adapted to receive and securely retain at least one locking means to prevent the theft or movement of a trailer having a trailer tongue.

The present invention is adapted to prevent the theft of a trailer while the trailer is not in use or is otherwise in a storage position. The present invention is further adapted to engage with a conventional ball receiver tongue commonly found in many trailer designs. Because the present invention includes, in one embodiment, only two primary components, the present invention is simple and inexpensive to manufacture.

The novel features of the present invention will become apparent to those of skill in the art upon examination of the following detailed description of the preferred embodiment or can be learned by practice of the present invention. It should be understood, however, that the detailed description of the preferred embodiment and the specific examples presented, while indicating certain embodiments of the present invention, are provided for illustration purposes only because various changes and modifications within the spirit and scope of the invention will become apparent to those of skill in the art from the detailed description, drawings and claims that follow.

BRIEF DESCRIPTION OF THE DRAWINGS

The accompanying figures further illustrate the present invention and, together with the detailed description of the preferred embodiment, assists to explain the general principles according to the present invention.

Additional aspects of the present invention will become evident upon reviewing the non-limiting embodiments described in the specification and the claims taken in conjunction with the accompanying figures, wherein like reference numerals denote like elements.

DETAILED DESCRIPTION OF THE PREFERRED EMBODIMENT

Figure 2:
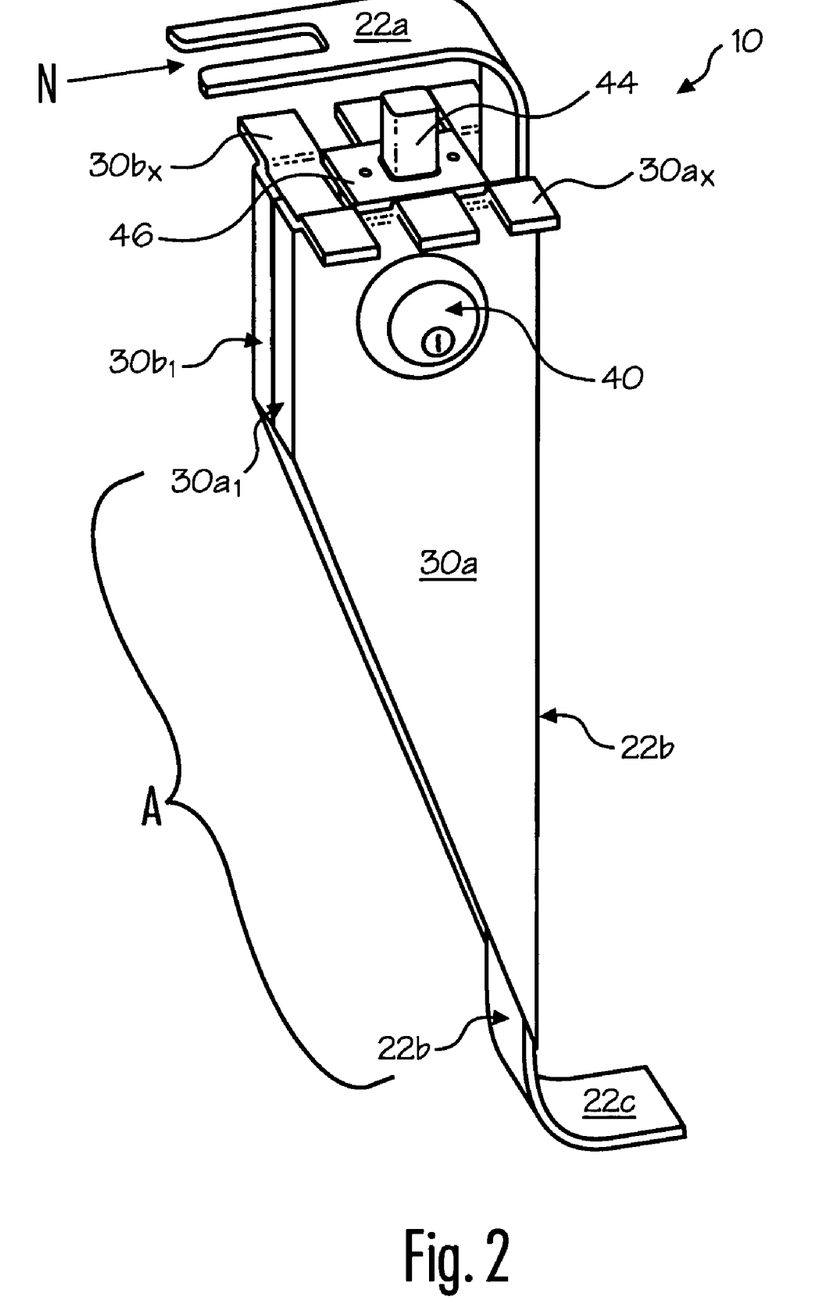
FIG. 2 is a side perspective view of one embodiment of the present invention.
Figure 3:
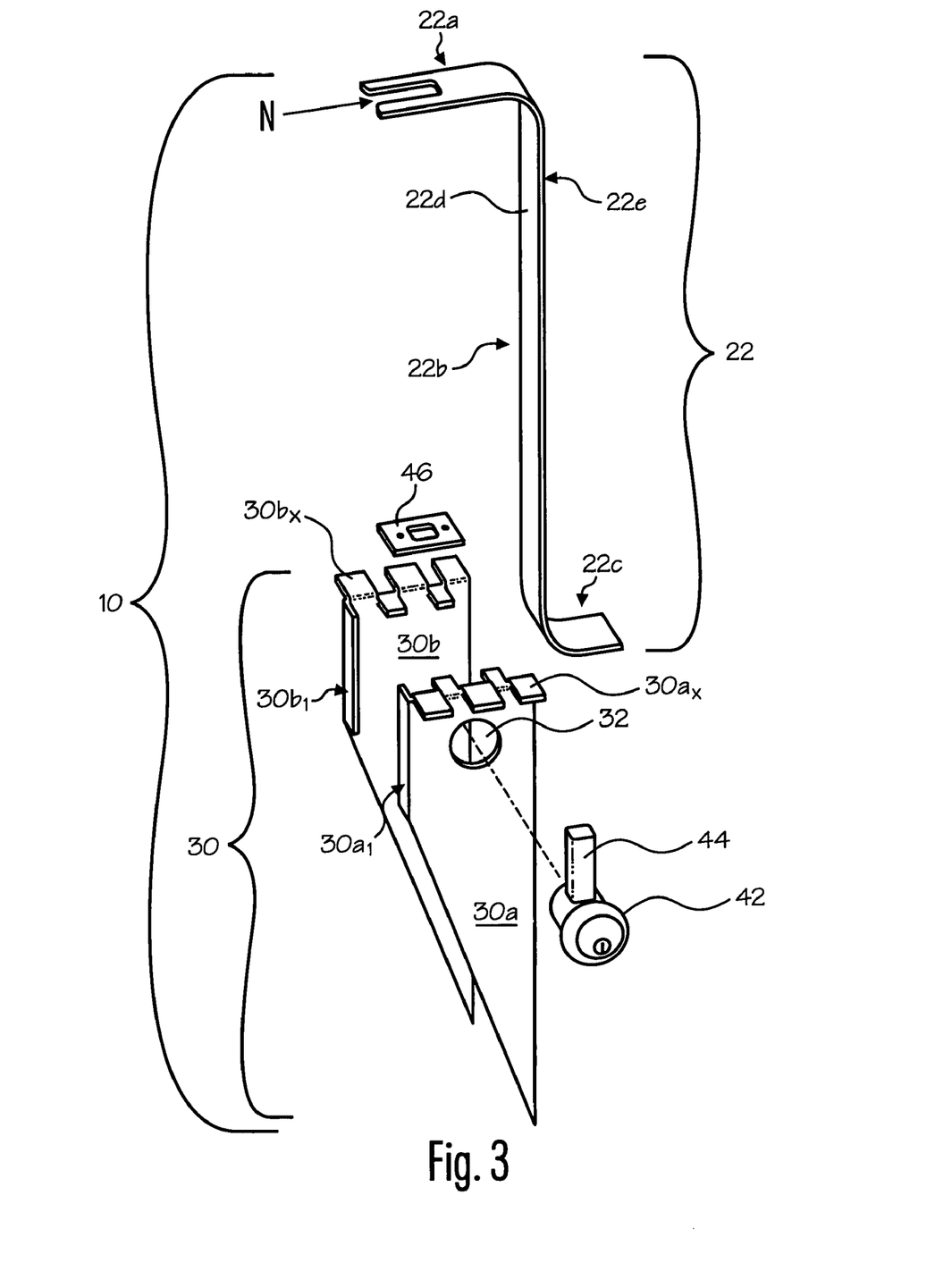
FIG. 3 is an exploded view of the three primary components of one embodiment of the present invention.
Figures 4, 5:
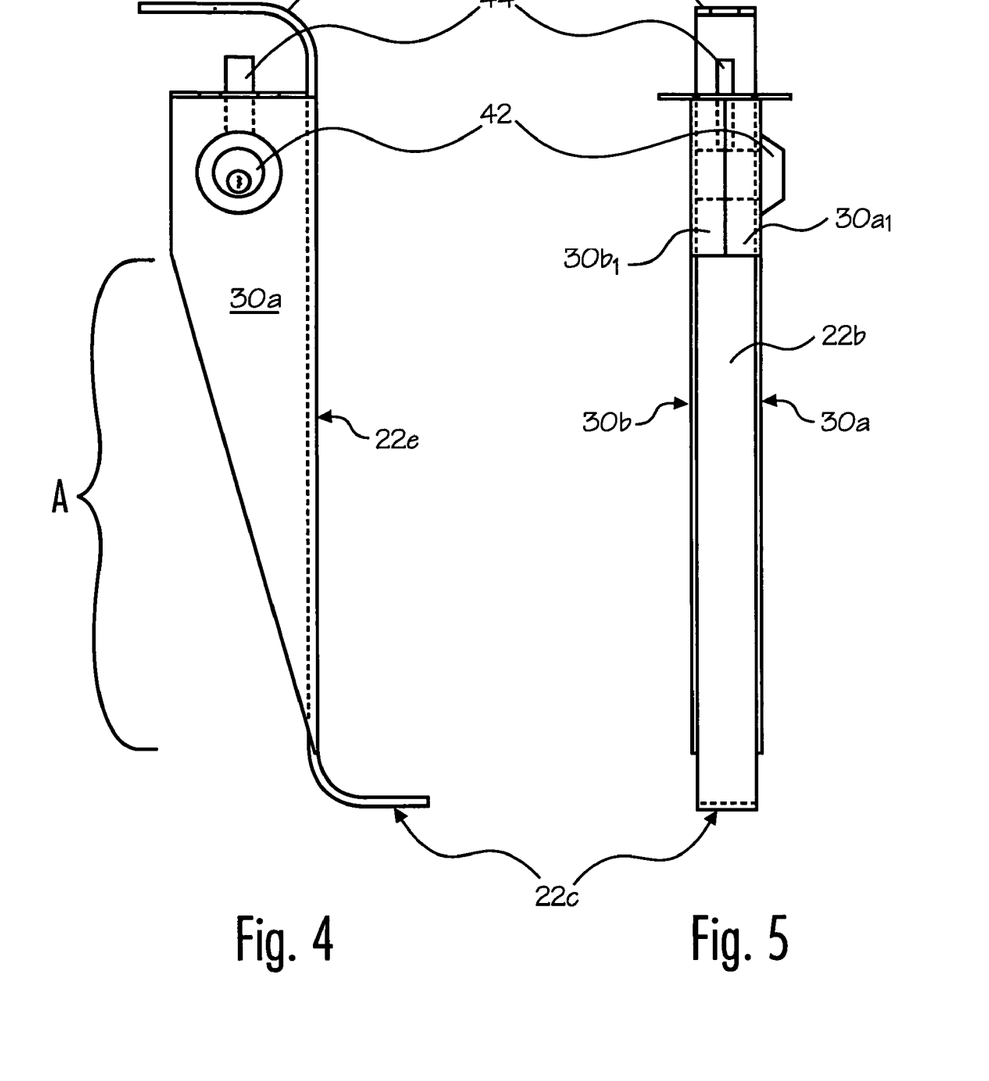
FIG. 4 is a right side plan view of the embodiment illustrated in FIG. 3 (when viewed from the perspective of the trailer tongue prior to engagement with the present invention)
FIG. 5 is a front side plan view of the embodiment illustrated in FIG. 4 (when viewed from the perspective of the trailer tongue prior to engagement with the present invention)

As seen in FIGS. 2 and 3, the present invention is a trailer locking system and apparatus 10 comprising, in one embodiment, a support strip 22, and a support housing 30. Preferably, at least one locking means 40 integrated with the support housing 30 for use with a trailer having a trailer tongue 100, the trailer tongue 100 having an integrated locking socket or dome 102, all as further described below. Upon review of the present disclosure, those of skill in the art will realize that the present invention may be embodied as a system, assembly, process or apparatus. Other variations and modifications of the present invention will be apparent to those of ordinary skill in the art, and is not limited except by the appended claims. The particular designs and configurations discussed herein can be varied, and are cited to illustrate particular embodiments of the present invention. It is contemplated that the use of the present invention can involve components having different characteristics as long as the principles disclosed herein are followed.

In one preferred embodiment as seen in FIGS. 2 and 3, the present invention's support strip 22 is formed from an elongated strip of hardened steel or like material which is adapted for tensile strength to prevent any further bending or malalignment. In one embodiment, the support strip is formed to have a width of approximately a ⅛ inch thick and a length of approximately 112 inches long, thereby defining an elongated strip. Of course, those of skill in the art will recognize that these dimensions may be modified, yet even in modified form, remain within the spirit and scope of the present invention.

As seen in FIG. 3, the support strip 22 is preferably adapted to include three sections, namely, a near tail 22a, a far tail 22c, and an elongated middle section 22b joining the near tail 22a and the far tail 22c therebetween. In one preferred embodiment of the present invention, the middle section 22b has a first surface 22d and a second surface 22e, the first surface 22d defined as being the opposite of (or, on the other side of) the second surface 22e. In this embodiment, the planar surface direction of the near tail 22a relative to the planar surface direction of the middle section 22b is formed at an angle approximately ninety (90) degrees counterclockwise from the first surface 22d (or, within twenty (20) degrees thereof, while the planar surface direction of the far tail 22c relative to the planar surface direction of the middle section 22b is formed at an approximately ninety (90) degree angle clockwise from the second surface 22e (or, within twenty (20) degrees thereof. As seen in FIG. 3, the planar surfaces of both the near tail 22a and the far tail 22c are in approximate parallel planar alignment so that support strip 22 can be said to have a generally "S" shape in one embodiment, and a generally "Z" shape in still another embodiment, so that in either embodiment, the far tail 22c is curved to serve as a flat footing means that rests on the ground when the present invention is in use. Those of skill in the art will recognize that support strip 22 may be formed from the same piece of material (e.g., heavy gauge steel), with the near tail 22a and the far tail 22c being folded or formed approximately ninety degrees in opposite directions.

Figure 6:
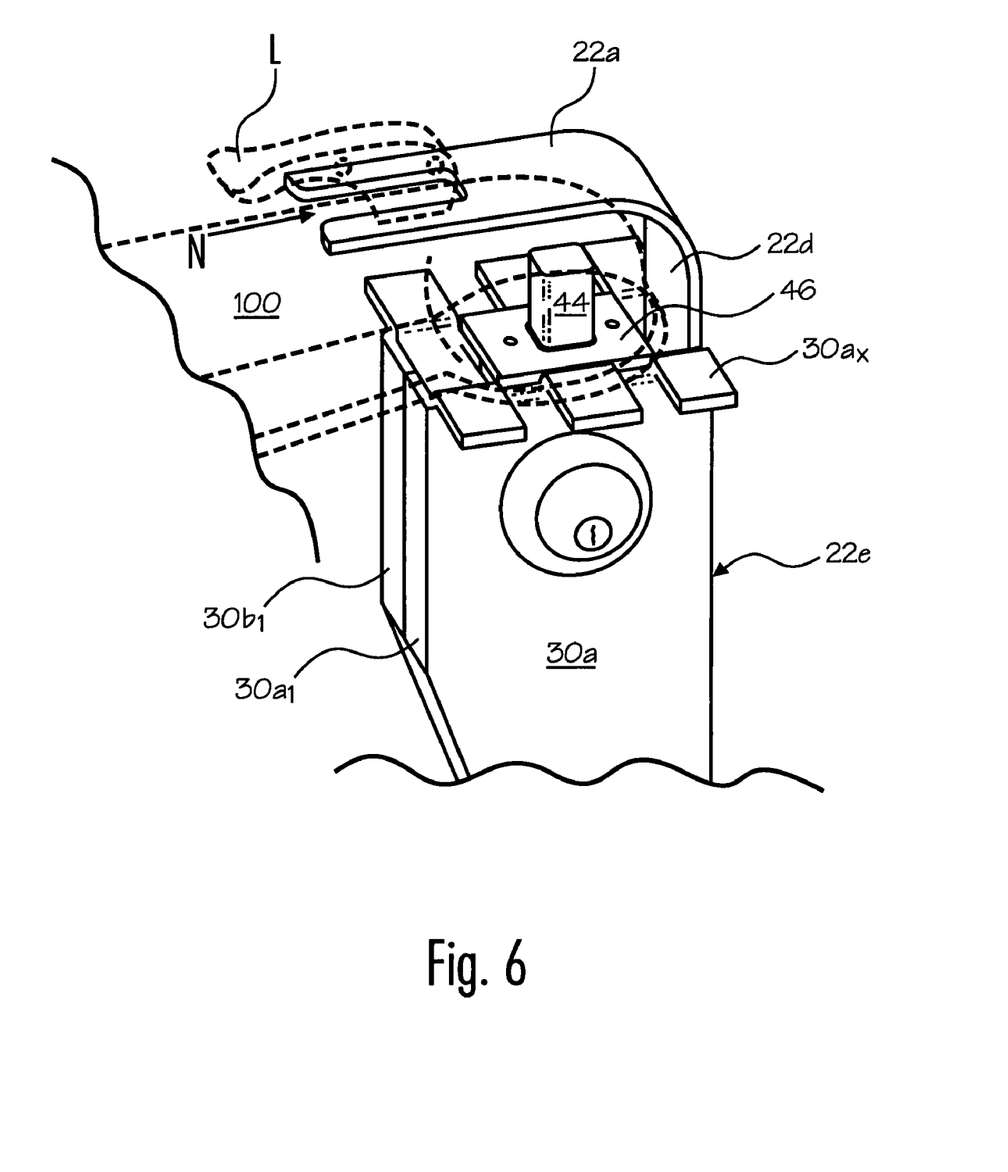
FIG. 6 is a partial right side perspective view of one embodiment of the present invention, this Figure being a detailed illustration of one embodiment of the present invention as it engages a trailer tongue.
Figures 7, 8:
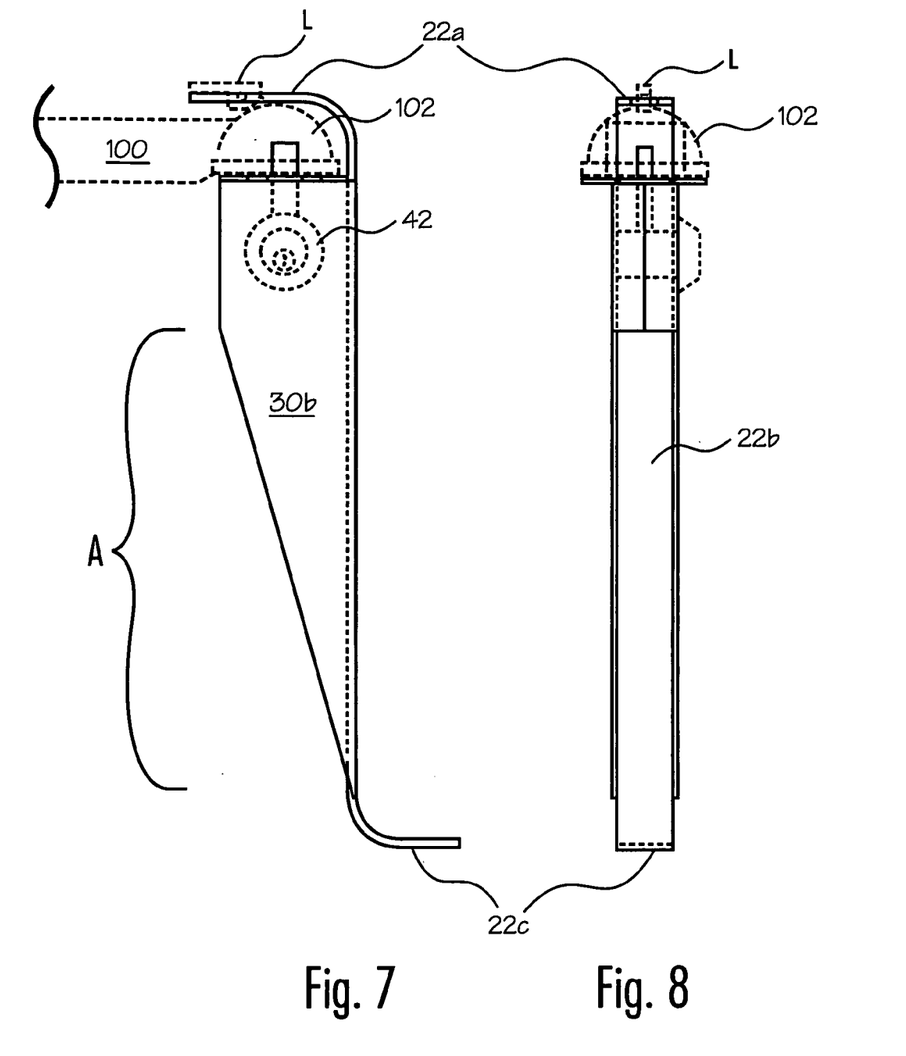
FIG. 7 is a right side plan view of the embodiment illustrated in FIG. 3 when engaged or otherwise coupled with a trailer tongue.
FIG. 8 is a front side plan view of the embodiment illustrated in FIG. 7 when engaged or otherwise coupled with a trailer tongue.

In still another embodiment, as seen in FIG. 6, the near tail 22a of support strip 22 is further preferably adapted to receive a latch L through formation of a notch N formed in the near tail 22a. Notch N is preferably adapted to receive a conventional ball locking mechanism latch typically found on trailer tongues.

As seen in FIGS. 2 and 3, support housing 30 comprises, in one embodiment, a first subhousing 30a and a second subhousing $30b_1$ the first subhousing 30a being a mirror replica of the second subhousing 30b so that the first subhousing 30a is adapted to mechanically communicate with the second subhousing 30b. Thus, in one embodiment, first subhousing 30a may also include folded first subsurface $30a_1$ while second subhousing 30b may also include folded second subsurface $30b_1$ so that first subsurface $30a_1$ has a facing relationship with second subsurface $30b_1$ when coupled together (such as through welding, for example, if the material forming the subhousings were steel). Moreover, as generally seen in FIGS. 2, 4, 5, 7 and 8, support housing 30 is also adapted to couple with the support strip's middle section 22b along a substantial edge of middle section 22b.

As seen in FIG. 2, the width of the top portions of first subhousing 30a and second subhousing 30b are each preferably approximately the same distance as the length of near tail 23a, but at a corresponding predetermined point along middle section 22b, the widths taper (or, are reduced) to having no width at a point closer to the far tail 22c so that support housing 30 may be said to have an angled (or, pie-shaped) bottom portion (the angled portion being generally identified as "A" in the attached drawings).

Figure 9:
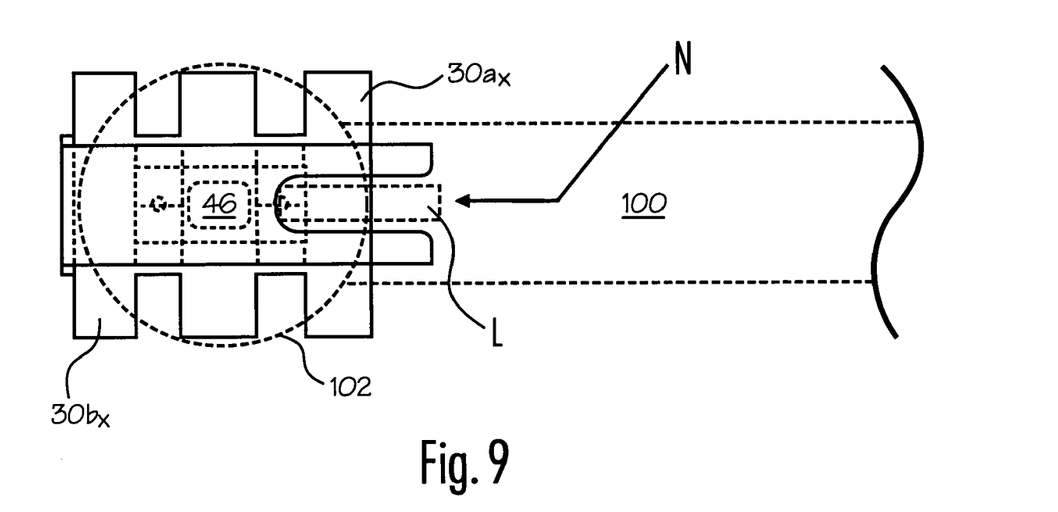
FIG. 9 is a top plan view of the embodiment illustrated in FIG. 7.
Figure 10:
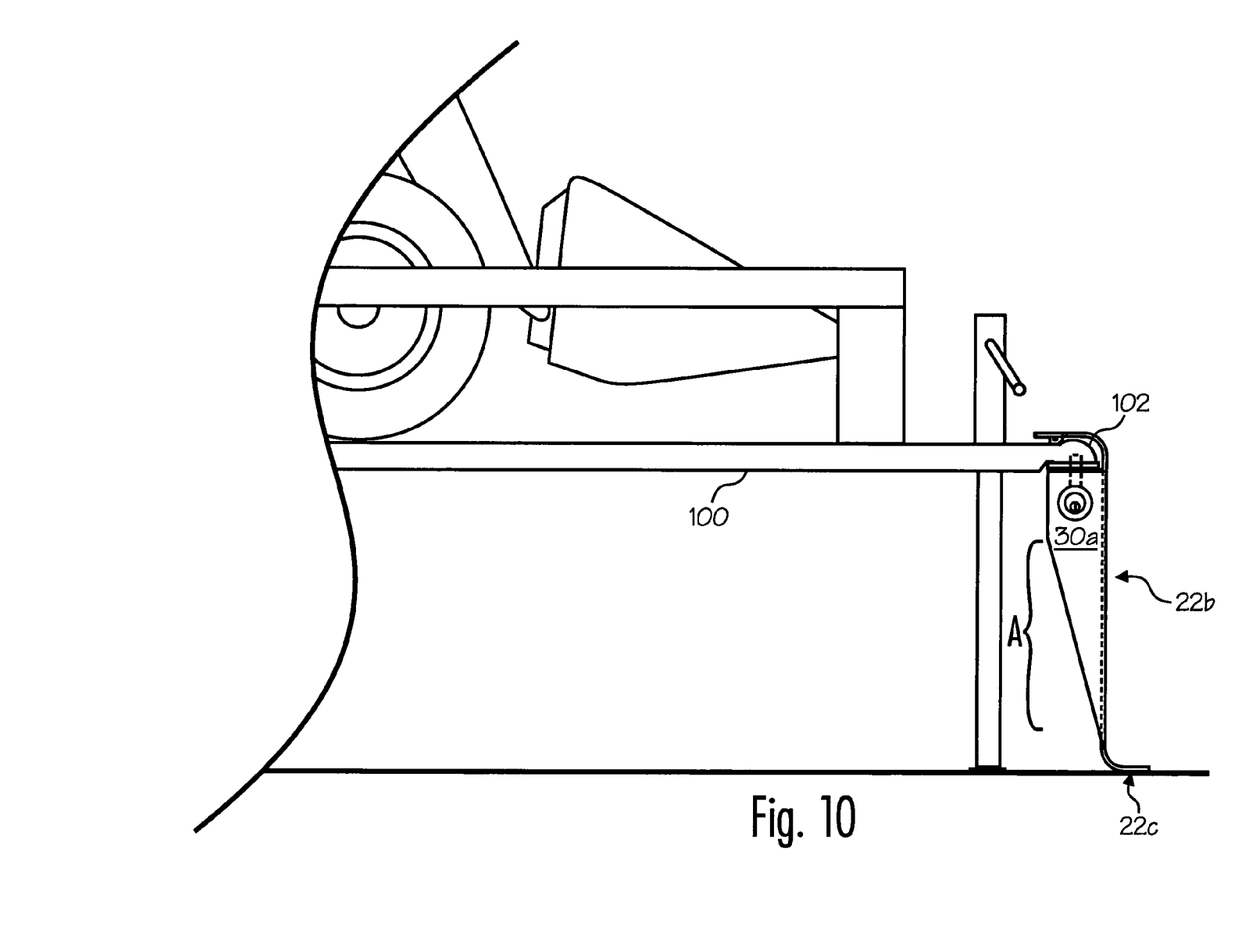
FIG. 10 is a side plan view of a trailer tongue assembly attached to or otherwise coupled to one embodiment of the present invention.

Preferably, support housing 30 may further include a lateral support means which is adapted to further provide overall mechanical stability of the trailer locking system and apparatus 10 by substantially preventing lateral movement of the present invention 10 when the present invention is engaged or otherwise coupled to a trailer tongue 100. Thus, in one embodiment, a representative lateral support means may be defined adapting the first subhousing 30a to include one or more first opposing fingers $30a_1$-$30a_x$ formed at a top end of the first subhousing 30a which are adjacent to the near tail 22a. Concurrently, in this embodiment, the second subhousing 30b includes one or more second opposing fingers $30b_1$-$30b_x$ formed at a top end of second subhousing 30b which are also adjacent to the near tail 22a, the second opposing fingers being a mirror image of the first opposing fingers. In this regard, as can be recognized from FIGS. 6 and 9, the fingers $30a_1$-$30a_x$ and $30b_1$-$30b_x$ formed on support housing 30 serve to prevent any lateral or side-to-side movement of the present invention 10 when it is in a locked position and engaged with, or otherwise coupled to, a trailer tongue's socket or dome 102.

The support housing 30 has several utilitarian functions. For example, support housing 30 serves to receive and retain a bolt lock assembly 40 and its corresponding bolt lock base plate 46 as more fully described below. Next, the configuration of support housing 30, along with its coupling with support strip 20, serves to provide overall tensile stability to the support strip when the present invention is in use. While the contemplated support strip 20 is adapted to prevent twisting or distortion under force, the integration of support housing 30 with support strip 20 further adds to the overall mechanical stability of the trailer locking system and apparatus 10 (whether when in use, or, in the event a thief attempts to break or tear apart the present invention). And, again, the integration of a lateral support means further imparts mechanical stability and anti-theft protection to the present invention 10 when in use. Additionally, support housing 30 and support strip 20 provides an enclosed structure which houses the contemplated lock mechanism 40, thereby preventing unauthorized access to the lock mechanism.

Of course, those of skill in the art will realize that while the support housing embodiment described above may be formed from multiple subhousings in one embodiment (e.g., subhousings 30a and 30b), the support housing 30 may also be formed from a single sheet of material and formed appropriately, thereby resulting in three major components of the present invention 10. Additionally, those of skill in the art will realize that the support strip 20 and the support housing 30 may also be integrally formed and manufactured from a single sheet of material and formed appropriately, thereby resulting in two major components of the present invention 10.

Turning now to FIGS. 2 and 3, one or more optional locking means 40, in one embodiment, may include a conventional bolt lock assembly adapted to easily integrate with the support housing 30. An exemplary locking means 40 comprises, in one embodiment, a lock assembly 42 having a bolt 44, and a corresponding bolt lock base plate 46 adapted to receive the bolt 44. As seen throughout the Figures, the support housing 30 is adapted to receive the locking means 40 at a top point substantially near the lateral support means. Thus, in one embodiment (as seen, for example, in FIGS. 3 and 6), the base lock plate 46 is adapted to securely sit upon the lateral support means in a location which allows bolt 44 to engage the inner area of socket or dome 102 when in a locked position. While the Figures disclose the locking means 40 as being implemented on the right side of the support housing 30, those of skill in the art will realize that the locking means may also be optionally integrated on the left side of the support housing 30.

In one embodiment, the locking means 40 may be a standard double keyed or "blind side" door deadbolt assembly. While a locking means is required to achieve the anti-theft functions of the present invention, the locking means may either be integrated with the housing/support structure, or, it may be separately purchased or obtained by a user and installed in the housing support structure disclosed herein (as may be necessary to accommodate various types of trailer tongue assemblies). Thus, for example, another exemplary locking means 40 may include a lock assembly for coupling to a trailer hitch sized ball shaped bolt (instead of the flat-sided round bolt used on standard door deadbolts).

In operation as seen in FIGS. 6-10, the present invention 10 is adapted for engagement with (or otherwise coupling to) a trailer tongue ball socket 102 after the trailer 100 has been disconnected from the tow vehicle. In use, the present invention 10 mechanically communicates with and engages the end of the ball receiver socket (or, dome) 102 of the trailer tongue in a vertical position so that support strip's far tail 22c is facing away from the trailer 100. The key is then turned to throw the deadbolt into the ball receiver part of the trailer hitch to lock it in place.

There are several unique advantages of the present invention compared to existing available anti-theft devices. For example, the present invention is simple to use, both when engaging a trailer for security, or when dis-engaging the invention. Moreover, the present invention relies on several major surface areas, which makes it difficult for a thief to use bolt cutters to remove the invention from a trailer. Additionally, when in use, the support strip's end tail 22c prevents the trailer from being simply attached to the bumper of a thief's vehicle and drug off. And, the steeply angled bottom portion of housing 30 prevents a chain or like apparatus from being wrapped under the present invention so that the trailer/invention can be towed (because, such a chain would slip downward along the angled portion of housing 30 as pulling force is applied to the chain, thereby causing the trailer locking device 10 to drag on the ground. Finally, the far tail 22c may be used to support the tongue end of the trailer 100 while the trailer is being stored or not used.

As will be appreciated by one of ordinary skill in the art, the present invention may be embodied as a system, process or apparatus, or any combination thereof. Accordingly, the present invention may take the form of an entirely software embodiment, an entirely hardware embodiment, or an embodiment combining aspects of both software and hardware. Additionally, in the foregoing specification, the invention has been described with reference to specific embodiments. However, it will be appreciated that various modifications and changes can be made without departing from the scope of the present invention as set forth in the claims below. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

Other variations and modifications of the present invention will be apparent to those of ordinary skill in the art, and it is the intent of the appended claims that such variations and modifications be covered. The particular values and configurations discussed above can be varied, are cited to illustrate representative embodiments of the present invention and are not intended to limit the scope of the invention. It is contemplated that the use of the present invention can involve components having different characteristics as long as the principle is followed.

The invention claimed is:

1. A trailer locking apparatus for a towable trailer, the apparatus comprising a support strip coupled to a support housing securely enclosing a locking means which is adapted to couple a trailer hitch securely to the apparatus, the support strip comprising a near tail, a far tail and an elongated middle section joining the near tail and the far tail therebetween, the support housing comprising at least a first subhousing and at least a second subhousing coupled to the middle section, the support housing further comprising a lateral support means adapted to prevent lateral movement of the apparatus when the apparatus engages the trailer.

2. The apparatus of claim 1 wherein the middle section has a first surface and a second surface, the first surface being on the other side of the second surface, wherein a planar surface direction of the near tail relative to a planar surface direction of the middle section is formed at an angle approximately between seventy five (75) degrees and one hundred and five (105) degree angle counterclockwise from the first surface, and wherein a planar surface direction of the far tail relative to the planar surface direction of the middle section is formed at an angle approximately between seventy five (75) degrees and one hundred and five (105) degree angle counterclockwise from the second surface, so that the far tail is adapted to serve as a flat footing means which that rests on the ground when the apparatus is coupled to a trailer.

3. The apparatus of claim 2 wherein the near tail of the support strip is adapted to receive a latch of a trailer through the formation of a notch formed on the near tail.

4. The apparatus of claim 1 wherein the support housing further comprises a first subhousing and a second subhousing, the first subhousing being a mirror replica of the second subhousing and being adapted to mechanically couple with the second subhousing, the first subhousing and the second subhousing further being adapted to couple with the support strip's middle section along a substantial edge of middle section.

5. The apparatus of claim 4 wherein a top portion width of first subhousing and a top portion width of second subhousing are each approximately the same distance as the length of the near tail, and wherein at a corresponding predetermined point along the middle section, both widths taper to having no width at a point closer to the far tail.

6. The apparatus of claim 1 wherein the support housing further comprises a lateral support means which is adapted to substantially prevent lateral movement of the apparatus when the apparatus is coupled to a trailer tongue hitch.

7. The apparatus of claim 6, the lateral support means comprising adapting the first subhousing to include one or more first opposing fingers formed at a top end of the first subhousing and which are adjacent to the near tail, and adapting the second subhousing to include one or more second opposing fingers formed at a top end of the second subhousing and which are also adjacent to the near tail, the second opposing fingers being a mirror image of the first opposing fingers, the fingers adapted to prevent lateral movement of the apparatus when the apparatus is coupled to a trailer tongue hitch.

8. The apparatus of claim 7 wherein the support strip and the support housing are formed from a single sheet of material.

9. The apparatus of claim 6, the support housing being adapted to receive the locking means at a top point substantially near the lateral support means. the locking means comprising a lock assembly having a bolt and a corresponding bolt lock base plate adapted to receive the bolt, the bolt lock base plate being adapted to securely sit upon the lateral support means in a location which allows the bolt to engage an inner area of a trailer hitch's locking dome when the apparatus is coupled to a trailer tongue hitch.

10. The apparatus of claim 9 wherein the locking means is a double keyed deadbolt assembly.

11. A process for preventing the theft of a towable trailer having a trailer hitch mechanism intended for coupling to a towing vehicle, the process comprising the steps of:

introducing a support strip having a near tail, a far tail and an elongated middle section;

coupling a support housing securely to the support strip between the near tail and the far tail, the support housing comprising at least a first subhousing and at least a second subhousing coupled to the middle section, the support housing further comprising a lateral support means adapted to prevent lateral movement of the apparatus when the apparatus engages the trailer; and securely locating a locking means within the support housing, the locking means adapted to engage the trailer hitch mechanism in order to prevent movement of the trailer.

12. The product made in accordance with the process of claim 11.

13. The process of claim 11 wherein the middle section has a first surface and a second surface, the first surface being on the other side of the second surface, wherein a planar surface direction of the near tail relative to a planar surface direction of the middle section is formed at an angle approximately between seventy five (75) degrees and one hundred and five (105) degree angle counterclockwise from the first surface, and wherein a planar surface direction of the far tail relative to the planar surface direction of the middle section is formed at an angle approximately between seventy five (75) degrees and one hundred and five (105) degree angle counterclockwise from the second surface, so that the far tail is adapted to serve as a flat footing means which that rests on the ground when the apparatus is coupled to a trailer.

14. The process of claim 11 wherein the support housing further comprises a first subhousing and a second subhousing, the first subhousing being a mirror replica of the second subhousing and being adapted to mechanically couple with the second subhousing, the first subhousing and the second subhousing further being adapted to couple with the support strip's middle section along a substantial edge of middle section.

15. The apparatus of claim 14 wherein the support housing further comprises a lateral support means being formed at an area adjacent to the near tail and which is adapted to substantially prevent lateral movement of the apparatus when the apparatus is coupled to a trailer tongue hitch.

16. The apparatus of claim 15, the lateral support means comprising adapting the first subhousing to include one or more first opposing fingers formed at a top end of the first subhousing and which are adjacent to the near tail, and adapting the second subhousing to include one or more second opposing fingers formed at a top end of the second subhousing and which are also adjacent to the near tail, the second opposing fingers being a mirror image of the first opposing fingers, the fingers adapted to prevent lateral movement of the apparatus when the apparatus is coupled to a trailer tongue hitch.

17. The apparatus of claim 16, the support housing being adapted to receive the locking means at a top point substantially near the lateral support means. the locking means comprising a lock assembly having a bolt and a corresponding bolt lock base plate adapted to receive the bolt, the bolt lock base plate being adapted to securely sit upon the lateral support means in a location which allows the bolt to engage an inner area of a trailer hitch's locking dome when the apparatus is coupled to a trailer tongue hitch.

18. An anti-theft assembly adapted to prevent the theft of a towable trailer while the trailer is not in use or is otherwise in a storage position, the assembly comprising at least one support strip coupled to at least one support housing which is adapted to securely retain a locking means, the support strip comprising a near tail, a far tail and an elongated middle section joining the near tail and the far tail therebetween, the support housing comprising at least a first subhousing and at least a second subhousing coupled to the middle section, the support housing further comprising a lateral support means adapted to prevent lateral movement of the apparatus when the apparatus engages the trailer, wherein the support housing further comprises a lateral support means being adapted to substantially prevent lateral movement of the apparatus when the apparatus is coupled to a trailer tongue hitch, the lateral support means comprising adapting the first subhousing to include one or more first opposing fingers formed at a top end of the first subhousing and which are adjacent to the near tail, and adapting the second subhousing to include one or more second opposing fingers formed at a top end of the second subhousing and which are also adjacent to the near tail, the second opposing fingers being a mirror image of the first opposing fingers, the fingers adapted to prevent lateral movement of the apparatus when the apparatus is coupled to a trailer tongue hitch, the locking means being adapted to securely couple the assembly to a trailer hitch when the trailer is intended to be stored or not used.

19. The assembly of claim 18, the support housing being adapted to receive the locking means at a top point substantially near the lateral support means. the locking means comprising a lock assembly having a bolt and a corresponding bolt lock base plate adapted to receive the bolt, the bolt lock base plate being adapted to securely sit upon the lateral support means in a location which allows the bolt to engage an inner area of a trailer hitch's locking dome when the apparatus is coupled to a trailer tongue hitch.

* * * * *